United States Patent
Cabrera et al.

(10) Patent No.: US 6,343,341 B1
(45) Date of Patent: Jan. 29, 2002

(54) EFFICIENT ACCESS TO VARIABLE-LENGTH DATA ON A SEQUENTIAL ACCESS STORAGE MEDIUM

(75) Inventors: Luis Felipe Cabrera; ATM Shafiqul Khalid, both of Bellevue; Stefan Robert Steiner, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/378,054

(22) Filed: Aug. 20, 1999

(51) Int. Cl.[7] .............................................. G06F 12/02
(52) U.S. Cl. .................. 711/111; 711/112; 711/114; 711/154
(58) Field of Search .................. 711/111, 112, 114, 711/154; 707/104, 511; 704/315, 233

(56) References Cited

U.S. PATENT DOCUMENTS

| | | | | |
|---|---|---|---|---|
| 5,956,729 A | * | 9/1999 | Goetz et al. ................ | 707/104 |
| 6,012,096 A | * | 1/2000 | Link et al. ................... | 709/233 |
| 6,078,934 A | * | 6/2000 | Lahey et al. ................. | 707/511 |
| 6,092,089 A | * | 7/2000 | Lahey et al. ................. | 707/511 |
| 6,105,072 A | * | 8/2000 | Fischer ........................ | 709/315 |

* cited by examiner

*Primary Examiner*—Than Nguyen
(74) *Attorney, Agent, or Firm*—Merchant & Gould P.C.

(57) ABSTRACT

A system, a method and a program product provide access to variable-length data segments on a sequential access storage medium using an iterative search for a specified data offset based on estimates of media offsets. The data is recorded in variable-length data segments aligned to predetermined alignment intervals. Each data segment has a predetermined signature field to identify the header of each data segment. Session data recorded on the medium so as to prevent session data that matches the signature field from being aligned with the predetermined alignment interval. Approximate or default parameters for data segment size are used for each estimate and are updated with each iteration based on actual data derived from data segment headers on the medium.

19 Claims, 6 Drawing Sheets

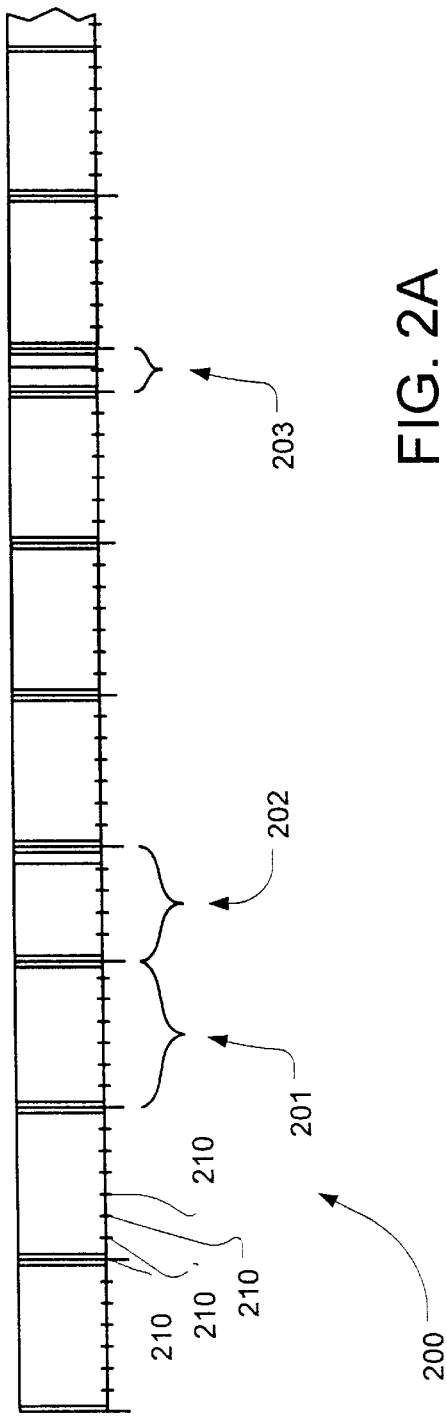
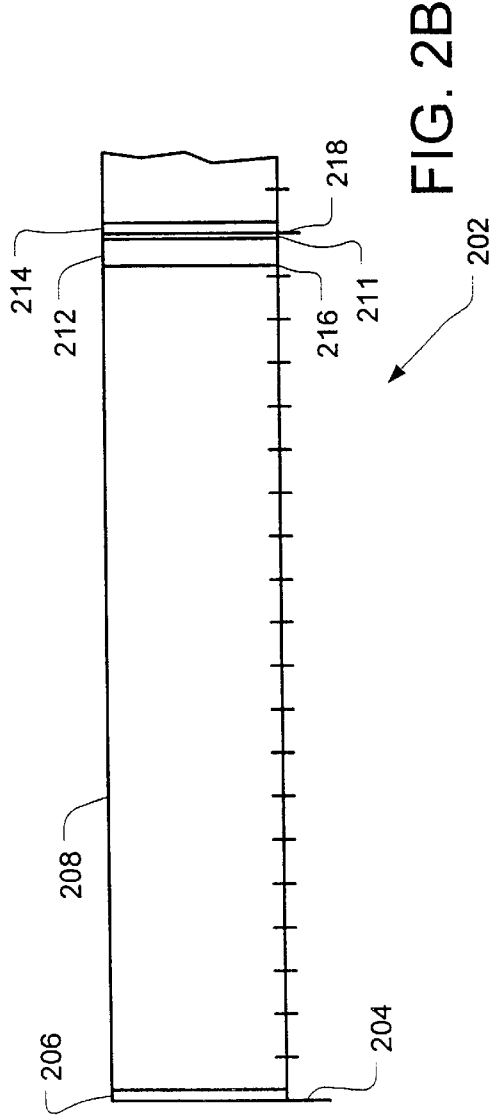

EFFICIENT ACCESS TO VARIABLE-LENGTH DATA ON A SEQUENTIAL ACCESS STORAGE MEDIUM

TECHNICAL FIELD

The invention relates generally to sequential access storage media, and more particularly to accessing variable-length data segments on a sequential access storage medium.

BACKGROUND OF THE INVENTION

Sequential access storage media, such as magnetic tapes and WORM (write-once, read many) optical disks, are typically used for the storage of large amounts of data. Sequential access storage media offer low cost storage options relative to other storage alternatives, such as magnetic disks, disk arrays, or random access memory (RAM). A disadvantage of sequential access storage media, however, is the relatively slow process of positioning to a specified location on the media. For a tape, such positioning typically involves the mechanical winding and/or rewinding of the media to locate the proper location of requested data on the tape. As such, positioning to a specified data offset on the tape presents a costly operation in the overall process of retrieving recorded data from a sequential access storage medium.

When writing a large data stream to a sequential access storage medium, it is desirable to divide the data stream into smaller data segments for several reasons. First, a segmented allocation of data improves error recovery. A data segment has a header and error recovery parameters, such as a checksum parameter. If a very large data stream comprises one data segment, the entire data stream must be read before the data segment can be validated. It is also possible for the entire one-data-segment data stream to become irrecoverable because of a minor error. Therefore, if the data stream is allocated into multiple smaller data segments, an error in a single data segment will not cause the entire data stream to become irrecoverable.

Second, it is desirable to have smaller segments because data segments can act as boundaries to facilitate the automatic flushing of data from system buffers. Generally, an application "writes" a block of session data to a system buffer before the data is actually recorded to the sequential access storage medium. Some systems use data segment boundaries to define the data that is automatically flushed by the system out of the buffer and to the medium.

Third, it is desirable to have smaller data segments because the entire length of the data stream may be unknown to the application when the "write" operation is initiated, thereby preventing storage of the data segment length in the data segment header. Alternatively, if the data stream is divided into multiple data segments, the application can specify a data segment length, even if the length of the entire data stream is not yet known.

One technique for decreasing the operative cost of positioning on a sequential access storage medium involves fixed-length data segments. That is, data to be recorded on the sequential access storage medium is allocated in fixed-length data segments recorded on the medium. Each data segment typically has a fixed-length header concatenated to the beginning of each data segment to specify, for example, a data segment index, the starting location of the data within the data segment, the data length within the segment, and the amount of padding. If the data recorded in a segment is shorter than the entire fixed-length data segment, the remainder of the segment is "padded" (i.e., subsequent session data is recorded in the next data segment and not in the remaining space in the current data segment).

It is to be understood that a media offset represents the sequential offset along the media, including headers, data, checksums, and padding, while a data offset represents a sequential offset of the data only, excluding headers, checksums, and padding. To locate a specified data offset $O_d$, a program (e.g., an operating system, an application, a system driver, or an embedded program) calculates the media offset to the data segment that includes the specified data offset $O_d$ using simple deterministic mathematics. A disadvantage of fixed-length data segments is that the data segments tend to be fixed at a large value (e.g., 64 KB (kilobytes)) and, therefore, can require significant padding, which diminishes the storage efficiency by introducing what is essentially wasted space on the medium.

To minimize the wasted space introduced by fixed-length data segments, an existing approach uses variable-length data segments to minimize the excessive padding of the fixed-length data segment approach. Variable-length segments imply that the data segments need not comply with a predetermined fixed-length, even though some or most of the data segments may have the same length. However, the simple deterministic position approach used in the fixed-length data segment approach does not work with variable-length data segments. Instead, the variable-length data segment approach involves sequential traversal of each header along the media to position a reader to a specified data offset. The data offset and data length information in each header along the media are sequentially evaluated until the data segment containing the specified data offset $O_d$ is reached. This traversal mechanism is time consuming, particularly for specified data offsets located at the end of the medium.

SUMMARY OF THE INVENTION

In accordance with the present invention, the above and other problems are solved by incorporating variable-length data segments onto a sequential access storage medium without requiring sequential traversal of the headers on the sequential access storage medium.

Methods and program products for accessing session data having variable-length data segments on a sequential access storage medium are provided. Each variable-length data segment includes a header having a predetermined signature field.

When storing data to the sequential access storage medium, the data segments are aligned to predetermined alignment intervals. The data segments are recorded on the sequential access storage medium such that no session data that matches the predetermined signature field is aligned with the predetermined alignment interval.

When retrieving session data from a specified data offset, one or more estimated media offsets are iteratively estimated to locate the specified data offset on the sequential access storage medium, each estimate moving forward or backward from the previous estimate on the medium. Each data segment located at an estimated medium offset is evaluated to determine whether it contains the specified data offset. When the specified data offset is found, a reader is positioned at the corresponding data segment, and the requested data recorded in the corresponding data segment is retrieved.

A system for accessing session data on a sequential access storage medium is also provided. When storing session data to a sequential access medium, a buffer receives and stores the session data. An allocation module allocates the session data to variable-length data segments in the buffer. Each variable-length data segment includes a header having a predetermined signature field. An alignment module aligns each header with a predetermined alignment interval on the sequential access storage medium. A recording module recording each variable-length data segment to the sequential access storage medium such that no session data that matches the predetermined signature field is aligned with the predetermined alignment interval.

When retrieving recorded data from a specified data offset on the sequential access storage medium including variable-length data segments, an estimation module iteratively estimates one or more estimated media offsets associated with data segments. A reader is configured to read data from the sequential access storage medium in accordance with a provided media offset. An evaluation module evaluating each estimated media offset on the sequential access storage medium to determine whether the data segment located at each estimated media offset includes the specified data offset. A positioning module positions the reader on the sequential access storage medium to the data segment that includes the specified data offset. An input module receives from the reader the recorded data located in the data segment at the specified data offset.

BRIEF DESCRIPTION OF THE DRAWINGS

FIG. 2A and 2B depict a sequential access storage medium having variable-length segments in an embodiment of the present invention.

DETAILED DESCRIPTION OF THE INVENTION

An embodiment of the present invention provides access to session data on a sequential storage medium having variable-length data segments. The session data is recorded in variable-length data segments aligned to predetermined alignment intervals. Each data segment has a predetermined signature field to identify the header of each data segment. Session data is recorded on the medium so as to prevent session data that matches the signature field from being aligned with the predetermined alignment interval. Retrieval of session data from the sequential access storage medium uses an iterative search for a specified data offset based on estimates of media offsets.

Figure 1:
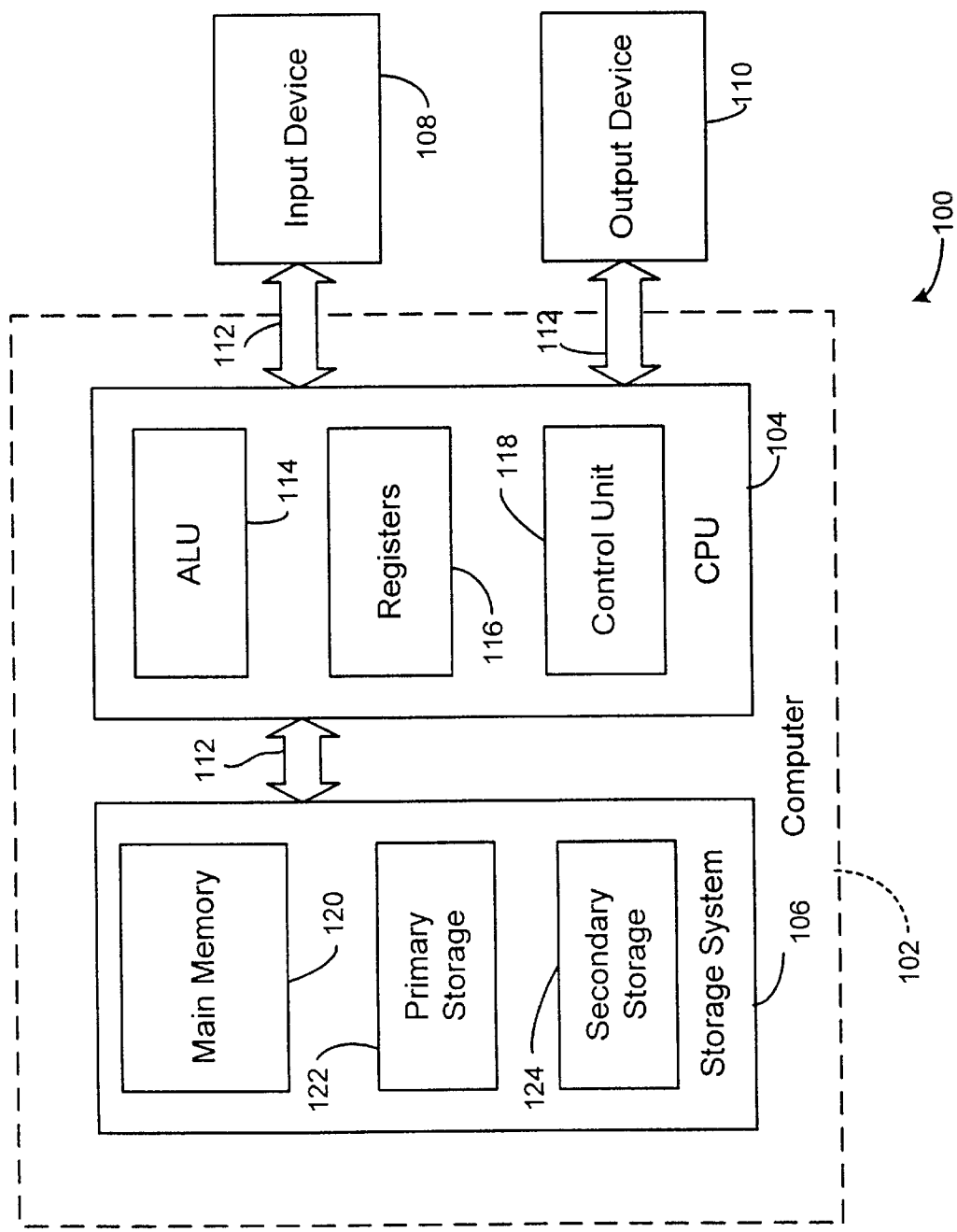
FIG. 1 depicts a block diagram of a suitable computing environment in which an embodiment of the present invention may be implemented.

FIG. 1 and the following discussion are intended to provide a brief, general description of a suitable computing environment in which an embodiment of the present invention may be implemented. Although not required, embodiments of the present invention will be described in the general context of computer-executable instructions, such as program modules, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may reside in both local and remote memory storage devices. In addition, the program modules may be embedded in firmware and executed by a microprocessor in a storage controller.

Referring to FIG. 1, an operating environment for an embodiment of the present invention is a computer system 100 with a computer 102 that comprises at least one high speed processing unit (CPU) 104, in conjunction with a storage system 106, an input device or module 108, and an output device or module 110. These elements are interconnected by at least one bus structure 112.

The illustrated CPU 104 is of familiar design and includes an arithmetic logic unit (ALU) 114 for performing computations, a collection of registers 116 for temporary storage of data and instructions, and a control unit 118 for controlling operation of the computer system 100. The CPU 104 may be a processor having any of a variety of architectures including x86 from Intel and others, including Cyrix and AMD, and the PowerPC from IBM and Motorola.

The storage system 106 generally includes high-speed main memory 120 in the form of media such as random access memory (RAM) and read only memory (ROM) semiconductor devices, and long term storage including a primary storage 122 and a secondary storage 124, each in the form of media such as floppy disks, hard disks, tape, CD-ROM, flash memory, optical disks and other devices that store data using electrical, magnetic, optical or other recording media. The main memory 120 also can include video display memory for displaying images through a display device. Those skilled in the art will recognize that the storage system 106 can comprise a variety of alternative components having a variety of storage capacities. In a preferred embodiment, the secondary storage 124 is in the form of a sequential access storage medium including variable-length data segments aligned on predetermined alignment intervals in accordance with the present invention. In an alternative embodiment, a system in accordance with the present invention may be implemented as a storage controller or tape drive, separate from the computer system, that receives a data stream from the computer system, a peripheral device, or a network.

The input device 108 and the output device 110 are also familiar. The input device 108 can comprise a keyboard, a mouse, a physical transducer (e.g., a microphone), etc. The output device 110 can comprise a display, a printer, a transducer (e.g., a speaker), etc. In an embodiment of the present invention, for example, a tape reader head is an input device and a tape recorder head is an output device.

As is familiar to those skilled in the art, the computer system 100 further comprises an operating system and usually one or more application programs. The operating system comprises a set of programs that control the operation of the computer system 100, control the allocation of resources, provide a graphical user interface to the user and includes certain utility programs such as the email system. An application program is software that runs on top of the operating system software and uses computer resources made available through the operating system to perform application specific tasks desired by the user. The email system in a preferred embodiment of the invention is integrated into the operating system. Alternatively, the email system could be embodied in an application program. Both are resident in the illustrated storage system 106. Preferably, the operating system employs a graphical user interface where the display output of an application program is presented in a rectangular area on the screen of the output device 110 and is also multitasking (executing computing tasks in multiple threads), such as Microsoft Corporation's "WINDOWS 95", "WINDOWS 98", or "WINDOWS NT" operating systems, IBM's OS/2 WARP, Apple's MACINTOSH SYSTEM 8 operating system, X-windows, etc.

In accordance with the practices of persons skilled in the art of computer programming, the present invention is described below with reference to acts and symbolic representations of operations that are performed by computer system 100, a separate storage controller or a separate tape drive (not shown), unless indicated otherwise. Such acts and operations are sometimes referred to as being computer-executed. It will be appreciated that the acts and symbolically represented operations include the manipulations by the CPU 104 of electrical signals representing data bits which causes a resulting transformation or reduction of the electrical signal representation, and the maintenance of data bits at memory locations in storage system 106 to thereby reconfigure or otherwise alter the computer system's operation, as well as other processing signals. The memory locations where data bits are maintained are physical locations that have particular electrical, magnetic, or optical properties corresponding to the data bits.

The computer system 100 may operate in a networked environment using logical connections to one or more remote computers or peripheral devices, in which case a network interface or a modem can be used as input device 108 and/or an output device 110. A remote computer may be a desktop computer, a server, a router, a network PC (personal computer), a peer device or other common network node, and typically includes many or all of the elements described above relative to the computer system 100. Logical connections may include a local area network (LAN) or a wide area network (WAN). Such networking environments are commonplace in offices, enterprise-wide computer networks, intranets, and the Internet.

FIG. 2A depicts a logical diagram of a sequential access storage medium 200 having variable-length segments in an embodiment of the present invention. The sequential access medium 200 may represent any storage device in which data is stored and retrieved sequentially, rather than in a random access manner, including without limitation reel tapes, cartridge tapes, and WORM disks. It is to be understood that data segments 201, 202, and 203 have different lengths. In FIG. 2B, predetermined alignment intervals (shown for example at 210) are logically and consistently spaced along the length of the sequential storage medium. In a preferred embodiment, the intervals 210 correspond to the length of tape required to store one kilobyte (KB) of data on the tape, although other intervals are contemplated within the scope of the present invention. In alternative embodiments, the predetermined alignment interval 210 may be determined arbitrarily, but typically, the interval 210 is determined based on the conventional alignment unit associated with sequential access storage controller parameters or operating system parameters defined in the system to optimize performance.

FIG. 2B depicts a more detailed representation of the data segment 202 in an embodiment of the present invention. Preferably, the data segment 202 comprises a fixed-length data segment header 206, a data region 208, an optional padding region 212, and an optional 4-byte checksum field 211. The header 206 (and therefore the data segment 202) is aligned on a predetermined alignment interval 204, which is one of the predetermined alignment intervals 210 of FIG. 2A. In a preferred embodiment, a data segment header comprises a signature (or type) field, an attribute field, a segment number field, a data offset field, a data length field, a pad length field, the previous data segment length field, and a checksum field. In one alternative embodiment, the previous data segment length is omitted.

The signature field stores a predetermined and consistent signature used to identify the start of a header, as opposed to arbitrary session data, for example. The retrieval process finds headers by searching for the signature on predetermined alignment intervals. There is, however, a possibility that arbitrary session data may be received that, by coincidence, exactly matches the signature of a header. If this matching session data is also aligned with a predetermined alignment interval, the retrieval process would mistake the session data for header data. Accordingly, the storing process of an embodiment of the present invention ensures that no session data that matches the signature is recorded in alignment with a predetermined alignment interval.

The attribute field includes parameters describing the data segment to improve performance. For example, the attribute field includes flags indicating whether the data segment includes padding or a checksum field, or whether the current data segment is the last data segment in the recorded session data. The segment number field is used to maintain the sequence of the data segments. The data offset field provides the predetermined data offset of the first byte of the data region in the current data segment. The data length field provides the length of the data in the data region of the current data segment. The pad length field provides the length of padding included at the end of the data segment. The previous data segment length field provides the length of the previous data segment in the sequence to facilitate backward searching. The checksum field stores a checksum for the data segment header itself.

The data region 208 includes fragments of session data provided by the computer system for recording on the sequential storage medium 200. The data region 208 of FIG. 2B terminates at a media offset 216, which is not aligned on a predetermined interval. The padding region 212 represents the region between the end of the data region 208 and the next predetermined alignment interval 218. As the term implies, the region is "padded" (e.g., session data is not recorded in the available space in the padding region 212) to align the next data segment with the next available predetermined alignment unit 218. As shown, the header 214 for the next data segment is aligned with the next predetermined alignment interval 218. It is possible, however, that a data region may be sized to terminate on a predetermined alignment interval so as to alleviate the need for padding in that data segment (see e.g., data segment 201). In embodiments including a data segment checksum field, the length of the checksum field is included in the length of the padding.

It is important to understand that in a sequential access medium, two different categories of offsets are employed: (1) media offsets, representing the sequential offset of information recorded along the media, including headers, data regions, checksums, and padding regions; and (2) data offsets, representing the sequential offset of data recorded on the media, excluding headers, checksums, and padding regions. Accordingly, predetermined alignment intervals are spaced along the medium in accordance with the medium offset. Furthermore, the storage device that reads and writes the data on the medium positions based on media offset. In contrast, when a client requests data stored on the storage medium, the client provides a specified data offset. An embodiment of the present invention accommodates the differences in media offset and data offset to find the media offset corresponding to a specified data offset in a medium including variable-length data segments.

Figure 3:
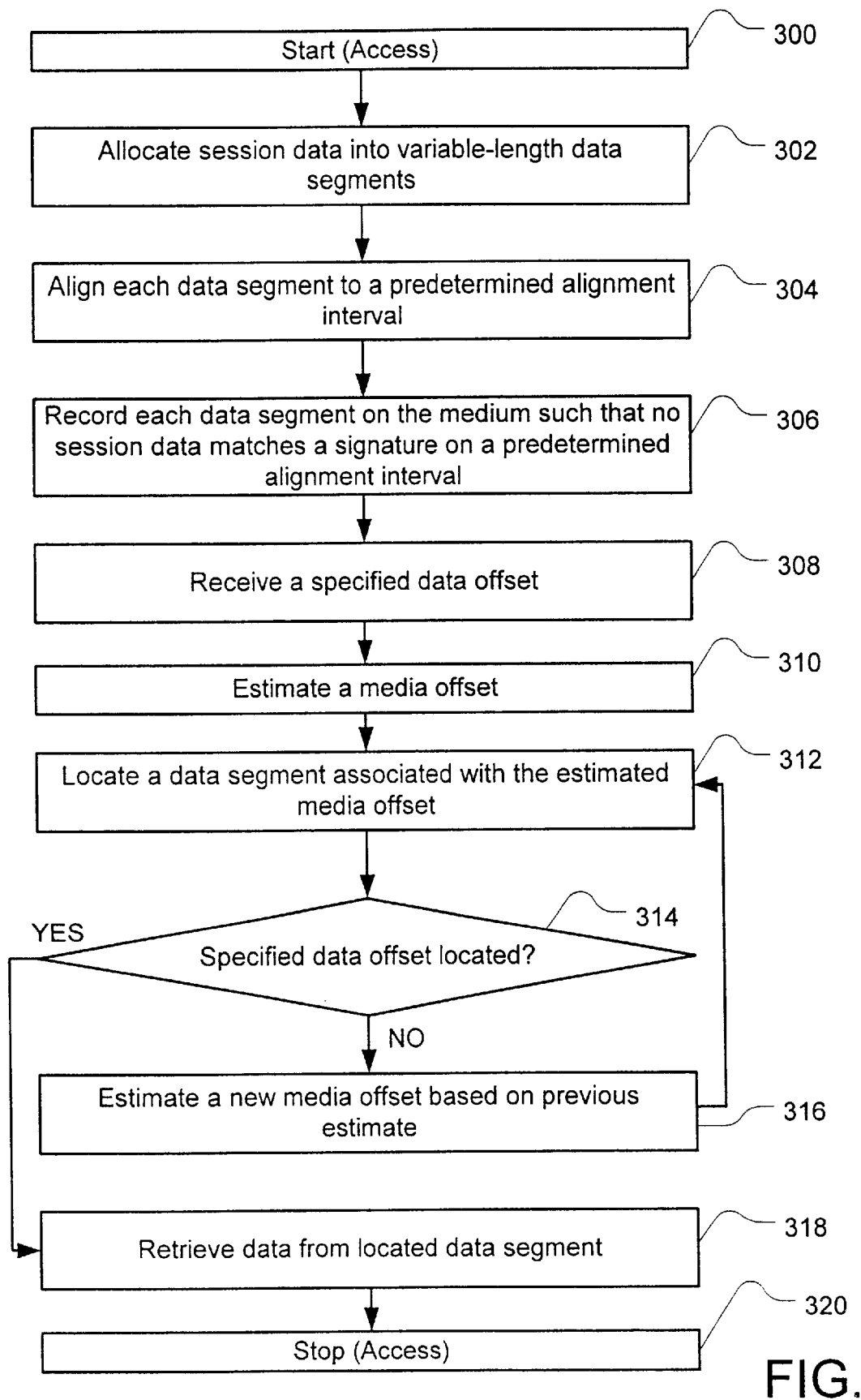
FIG. 3 depicts a flowchart of operations for accessing session data recorded in variable-length segments to a sequential storage medium in an embodiment of the present invention.
Figure 4:
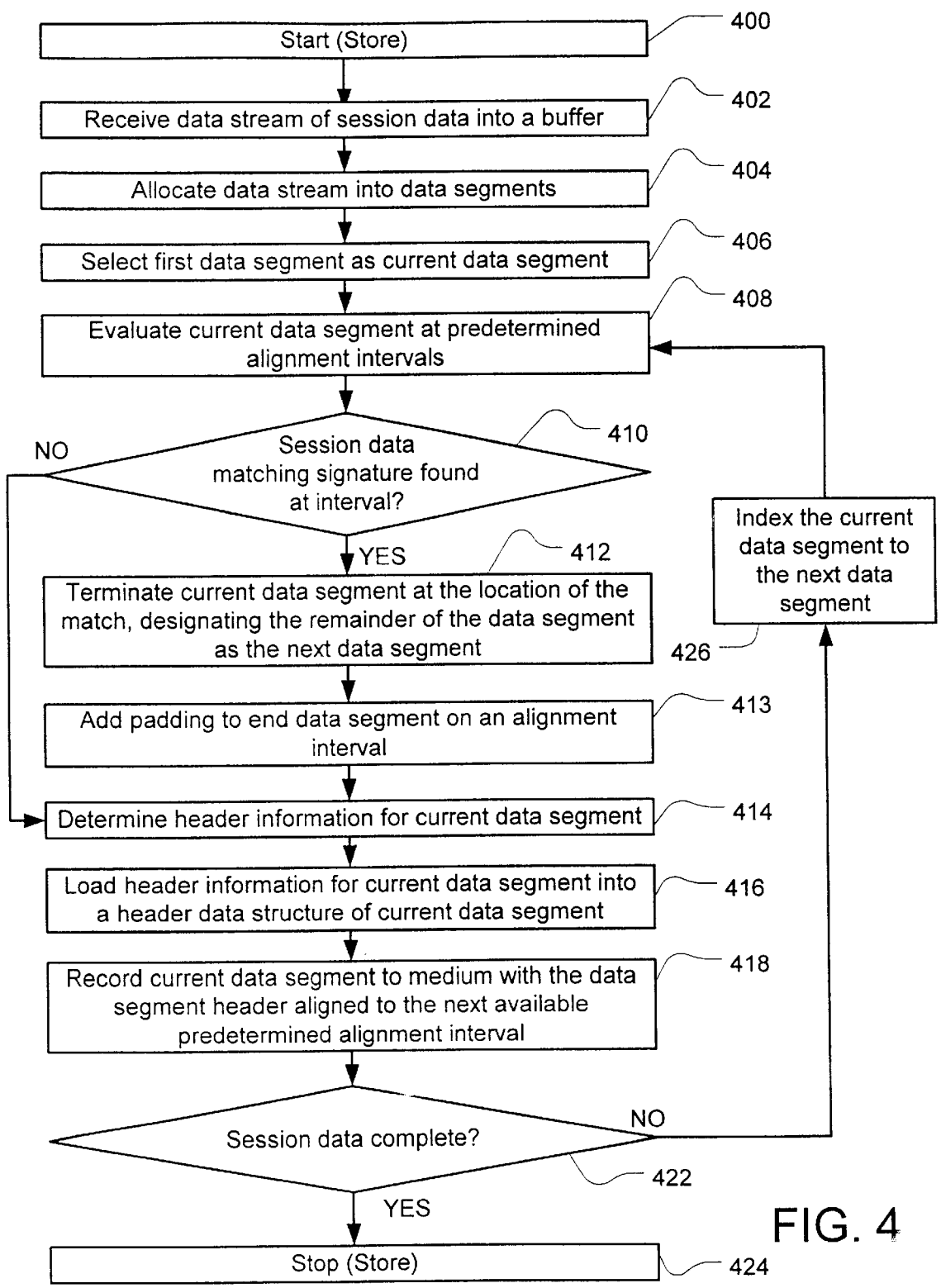
FIG. 4 depicts a flowchart of operations for storing session data to a sequential access storage medium in an embodiment of the present invention.

FIG. 3 depicts a flowchart of operations for accessing session data recorded in variable-length segments to a sequential storage medium in an embodiment of the present invention. "Accessing" generically refers to storing data, retrieving data, or both (as illustrated in FIG. 3). The process begins at operation 300, where session data is received into a buffer. Operation 302 allocates the session data into variable-length data segments. Operation 304 aligns each of the data segments to a predetermined alignment interval. Operation 306 records each data segment on the sequential storage medium in accordance with the alignment and ensures that no session data that matches the signature of a data segment is recorded to align with a predetermined alignment interval. As illustrated in FIG. 4, an embodiment of the present invention divides a data segment having such a match into two different data segments to ensure that the signature-matching session data is not aligned with a predetermined alignment interval.

In operation 308, a specified data offset is received from a client requesting data to be read from the sequential storage medium. Operation 310 estimates a media offset, which is intended to approximate the location of a data segment header on the medium. Operation 312 locates the data segment associated with the estimated media offset and evaluates the data segment header. Operation 314 determines whether the specified data offset is included in the located data segment. If not, a new media offset is estimated based on the previous estimated media offset, and processing proceeds to operation 312 to iteratively locate the specified data offset. If the specified data offset is located, the operation 318 retrieves the data from the located data segment. The process terminates at operation 320.

FIG. 4 depicts a flowchart of operations for storing session data to a sequential access storage medium in an embodiment of the present invention. Operation 400 initiates the storing process. In operation 402, a data stream of session data is received into a buffer by a server (or consumer) from a data source client (or producer). The data source client may be any application or system service that sends data to be stored on a sequential access storage medium with or without an initial estimate of the total data size of the session data. A server represents a process or service that accumulates in buffers the session data from one or more data sources and causes the recording of the data on the medium.

A "session" refers to the complete process of storing a collection of data to a sequential storage medium. The data source issues one or more "write" operations in each session. The session data provided by the write operations is collected in one or more buffers until the buffers are flushed. A "flush" operation causes buffered data to be "flushed" out of the buffer and recorded to the medium. A flush operation may be issued by the data source client or internally by the server itself (e.g., automatic flushing). Typically, a time out condition or other event acts as a trigger for automatic flushing by the server, and the flushed data is defined by the data segment boundaries.

In operation 404, the session data is allocated into data segments. In an embodiment of the present invention, the allocation is initially based on a conventional data segment length (such as 64 KB), which is a multiple of the predetermined alignment interval (such as 1 KB). The session data allocated to the last data segment, however, may not fill the entire conventional data segment length. Therefore, the final data segment in the sequence may require padding.

Operation 406 selects the first data segment in the sequence as the current data segment on which to operate. Operation 408 evaluates the data region of the current data segment to determine whether session data that is aligned to a predetermined alignment interval matches the signature. It is to be understood that the data segment header length must also be considered in this evaluation. For example, if the data segment is 40 bytes and the predetermined alignment interval is 1024 bytes, then the first evaluation will be 984 bytes into the data region of the current data segment, and subsequent evaluations will be at 1024 byte intervals thereafter until the end of the data segment.

Operation 410 directs processing to operation 412 if a match between the signature and the session data is detected on a predetermined alignment interval. If no match is detected, processing proceeds to operation 414. Operation 412 effectively divides the current data segment into two data segments by terminating the current data segment at the location of the match. The remaining data from the data segment is allocated to a new data segment designated to be the next data segment in the sequence. This processing ensures that no session data exists on a predetermined alignment interval that matches the signature. Operation 413 inserts padding into the data segment to ensure that it terminates on a predetermined alignment interval and to start the header of the next data segment on a predetermined alignment interval. Operation 414 determines the header information for the current data segment. Operation 416 loads the header information for the current data segment into a header data structure. Operation 418 records the current data segment, including the header, the data region, and optional checksum with any required padding to the sequential access storage medium.

If additional data segments remain to be processed, operation 422 directs processing to operation 426, which indexes to the next data segment, and processing repeats to step through the remaining data segments. If no additional data segments remain to be processed, operation 424 terminates the storing process. The last data segment need not be the same size as the previous data segment, so long as the size is a multiple of the predetermined alignment interval. Therefore, the session data for the last data segment is recorded to the medium, and the data segment is padded (including the checksum field, if any) to align the end of the data segment with a predetermined alignment interval.

Figure 5A:
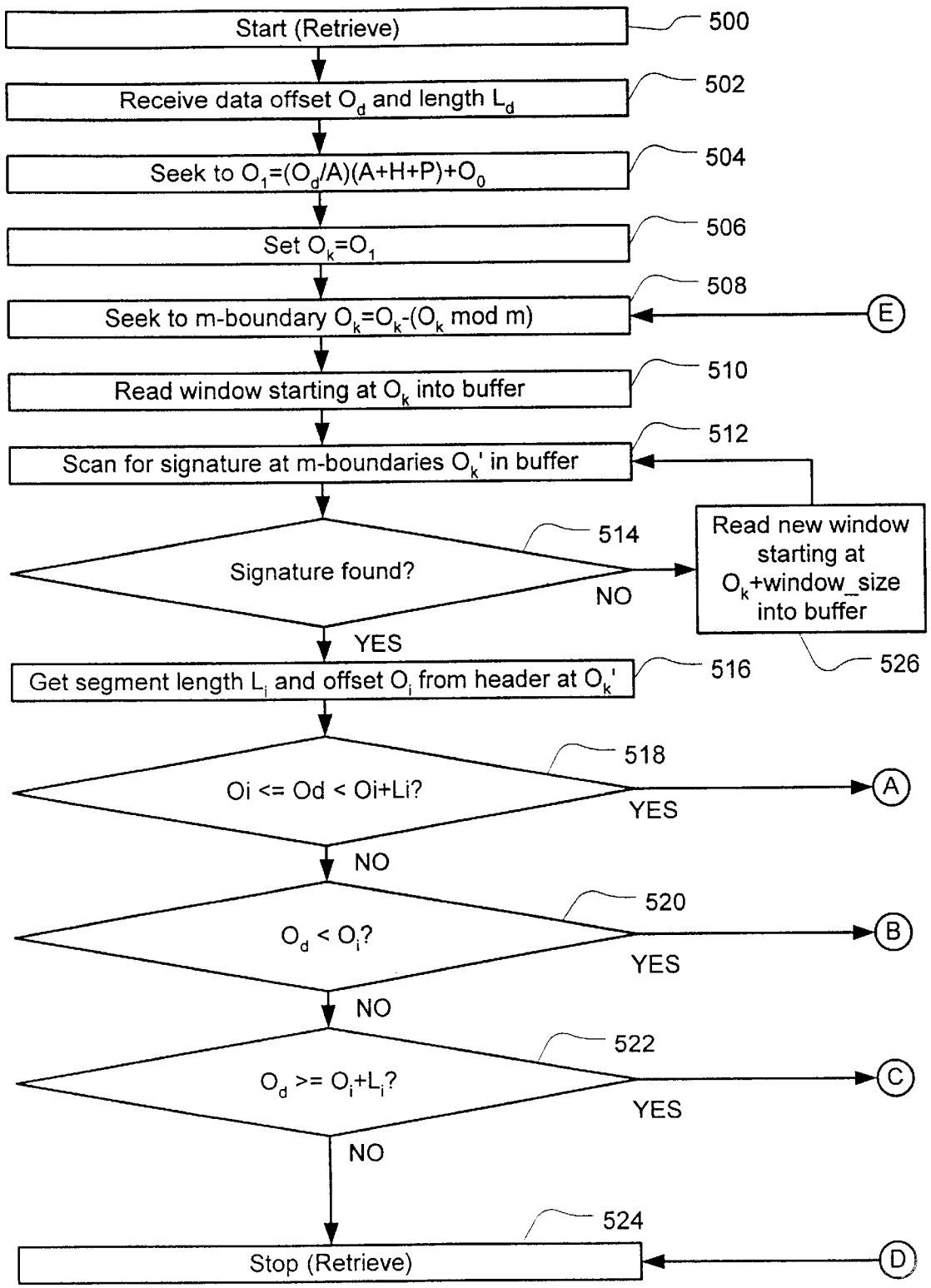
FIGS. 5A and 5B depict a flowchart of operations for retrieving data from a specified data offset on a sequential access storage medium in an embodiment of the present invention.
Figure 5B:
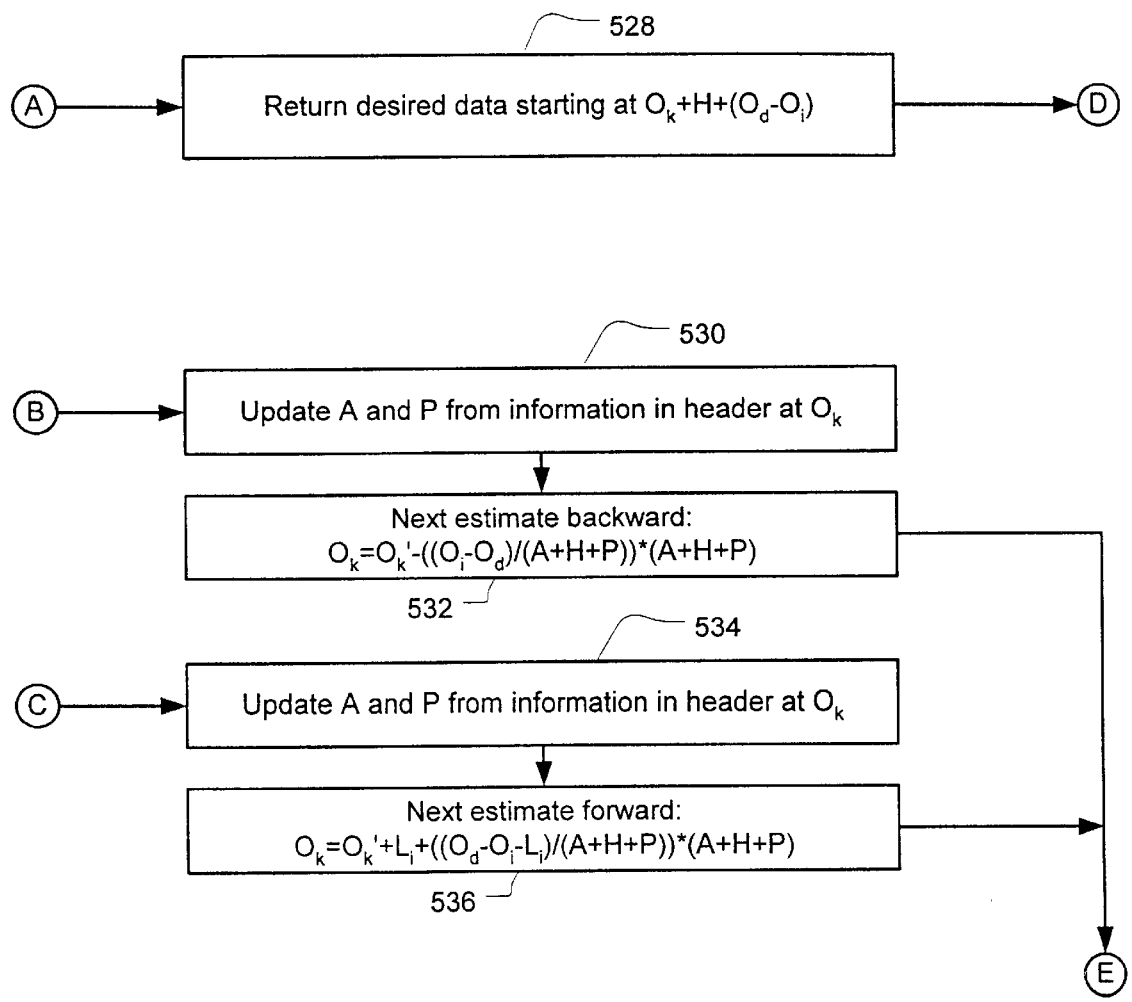

FIGS. 5A and 5B depict a flowchart of operations for retrieving data from a specified data offset on a sequential access storage medium in an embodiment of the present invention. Operation 500 initiates the retrieval process. Operation 502 receives a specified data offset $O_d$ and desired length $L_d$ from a client. An object of the retrieval process is to locate the media offset $O_i$ to the data segment that contains the data at data offset $O_d$.

The retrieval process relies on various known or predicted parameters of the data stored on the tape. The parameters may be stored on the medium (i.e., on-line parameters) and/or stored within the system. A parameter "A" represents an approximate or average data region length in a segment.

In an embodiment of the present invention, the parameter A represents a statistical average of data segment lengths written by the storage device or operating system, or written to the medium. In an alternative embodiment of the present invention, the parameter A represents an initial default data region size, preferably based on a conventional data region length. A parameter "H" represents the size of the fixed-length header, which is 40 bytes in a preferred embodiment. A parameter "$O_0$" represents the starting media offset of the first data segment on the medium. A parameter "P" represents an approximate or average padding length per data segment, and may be initially defined in a manner similar to parameter A. A reasonable initial value for P is zero. In a preferred embodiment, the parameters A and P are updated after each iteration to improve the accuracy of the approximation. A parameter m represents the predetermined alignment interval, which is 1 KB in an embodiment of the present invention.

The number of data segments between $O_0$ and $O_d$ can be approximated as $N=(O_d/A)$, where the "/" operation represents integer division (i.e., $O_d/A$ yields the integer portion of the quotient). Operation 504 determines an initial media offset estimate $O_1$, where $O_1=O_0+N*(A+H+P)$, where A+H+P represents an estimated data segment length and the "*" operator represents multiplication. If a data segment checksum is included in the data segment, the length of the checksum field would also be included in the estimated data segment length. In operation 506, $O_k$ is set equal to $O_1$. Operation 508 aligns $O_k$ to an m-boundary (i.e., a predetermined alignment interval) by assigning $O_k=O_k-(O_k \bmod m)$, where "=" represents a common assignment operator. The "mod" operation determines the remainder of $O_k$ divided by m. Effectively, operation 508 sets $O_k$ to the predetermined alignment interval equaling or preceding an estimated media offset $O_k$.

A window of sequential media data is retrieved into a buffer from the sequential storage medium in operation 510, starting at the $O_k$ determined in operation 508. In an embodiment of the present invention, the window length ("window_length") is 100 KB long, although other window sizes are used in alternative embodiments. Operation 512 sequentially scans the buffer at the predetermined boundary intervals until it locates a signature at media offset $O_k'$ or exhausts the window. If a signature is not found, operation 514 directs processing to operation 526, which retrieves into the buffer a new window of data from the medium at $O_k$+window_length. This loop repeats until a signature is located in operation 514. Exception processing exists to handle the condition where the first estimate seeks to the last data segment on the medium, in which case a header is never found in the loop associated with operation 514. The exception processing causes an error to be issued or re-calculates a first estimate having a smaller media offset and continues at operation 508.

Having located a signature (and, therefore, a header of an i-th data segment), operation 516 retrieves the data offset $O_i$ and the length $L_i$ of the i-th data segment. Operation 518 determines whether the i-th data segment includes the specified data offset $O_d$ using the condition $O_i<=O_d<O_i+L_i$. If the condition of operation 518 is true (i.e., the i-th data segment includes the specified data offset $O_i$), processing proceeds through connector (A) to operation 528 of FIG. 5B. In operation 528, the desired data is located at media offset equaling $O_k'+H+(O_d-O^i)$ and returned to the client. Processing then proceeds through connector (D) to terminate the process.

If the condition of operation 518 is false, then operation 520 determines whether the desired data offset $O_d$ is located before the i-th data segment (i.e., at a lower numbered data segment on the media), using the condition $O_d<O_i$. If so, processing proceeds through connector (B) to operation 530, which uses data from the header of the i-th data segment to update the parameters A and P. In an embodiment of the present invention, the known data length and padding length from the i-th data segment header are averaged with the parameters A and P, respectively. The averages are then assigned to A and P as appropriate. Other updating techniques may be used to update the parameters A and P in alternative embodiments of the present invention.

Using the updated values of A and P, operation 532 determines a new media offset estimate at $O_k=O_k'-((O_i-O_d)/(A+H+P))*(A+H+P)$, where the "/" operation represents integer division. Processing then proceeds through connector (E) to operation 508 to search for the proper data segment near the new estimate. In an alternative embodiment of the present invention in which the previous data length field is included in the header, an intermediate operation may be inserted before operation 532 to evaluate the previous data length value in the header in relation to the data offset value to determine if the specified data offset $O^d$ is included in the previous data segment.

If the condition of operation 520 is false, operation 522 determines if the desired data offset is located after the i-th data segment, using the condition $O_d>=O_i+L_i$. If so, processing proceeds through connector (C) to operation 534 to update the parameters A and P. Using the updated values for A and P, operation 536 determines a new media offset estimate at $O_k=O_k'+L_i-((O_dO_i-L_i)/(A+H+P))*(A+H+P)$, where the "/" operation represents integer division. Processing then proceeds through connector (E) to operation 508 to search for the proper data segment near the new estimate. If operation 522 is false, processing proceeds to operation 524 to terminate the process, preferably handing an error condition wherein the location of the specified data offset $O_d$ fails.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer program storage medium readable by a computing system and encoding a computer program for executing a computer process accessing session data on a sequential access storage medium, the computer program comprising instructions for:

allocating the session data to a plurality of variable-length data segments, each variable-length data segment including a header having a predetermined signature field;

aligning each header with a predetermined alignment interval associated with the sequential access storage medium;

recording each variable-length data segment on the sequential access storage medium such that no session data that matches the predetermined signature field is aligned with the predetermined alignment interval;

receiving a specified data offset including a recorded data portion of the session data;

iteratively estimating one or more estimated media offsets associated with data segments;

positioning to each estimated media offset on the sequential access storage medium to determine whether the data segment located at each estimated media offset includes the specified data offset;

positioning on the sequential access storage medium to the data segment that includes the specified data offset; and retrieving the recorded data portion located in the data segment at the specified data offset.

2. The computer program storage medium of claim 1 wherein instructions for estimating comprise instructions for estimating the estimated media offsets based on the specified data offset and an estimated data segment size.

3. A method for storing session data to a sequential access storage medium, the method comprising:

allocating the session data to a plurality of variable-length data segments, each variable-length data segment including a header having a predetermined signature field;

aligning each header with a predetermined alignment interval on the sequential access storage medium; and recording each variable-length data segment to the sequential access storage medium such that no session data that matches the predetermined signature field is aligned with the predetermined alignment interval.

4. The method of claim 3 wherein the recording operation comprises:

evaluating portions of the session data aligned with the predetermined alignment interval to determine if one of the portions matches the predetermined signature field;

dividing the variable-length data segment at the location of the match, if one of the portions matches the predetermined signature field, to provide a first data segment and a second data segment;

recording the first data segment with a first header aligned with the predetermined alignment interval; and recording the second data segment with a second header aligned with the predetermined alignment interval.

5. A computer-executable program product having program instructions stored on a computer-readable medium for executing the operations of claim 3.

6. A method for retrieving recorded data from a specified data offset on the sequential access storage medium including a plurality of variable-length data segments, the method comprising:

iteratively estimating one or more estimated media offsets associated with data segments;

evaluating each estimated media offset on the sequential access storage medium to determine whether the data segment located at each estimated media offset includes the specified data offset;

positioning on the sequential access storage medium to the data segment that includes the specified data offset; and retrieving the recorded data located in the data segment at the specified data offset.

7. The method of claim 6 wherein the estimating operation comprises estimating the estimated media offsets based on the specified data offset and an estimated data segment size.

8. The method of claim 6 wherein the estimating operation comprises:

determining a first media offset;

estimating a second media offset based on the specified data offset and the first media offset;

locating a header of a current data segment located at the second media offset; and retrieving the recorded data from the specified data offset in the current data segment, if the specified data offset is included in the current data segment.

9. The method of claim 8 wherein the operation of estimating a second media offset comprises:

determining whether the specified data offset is located before or after the current data segment based on the specified data offset and a predetermined data offset and length of the current data segment.

10. The method of claim 8 further comprising:

estimating a third media offset based on the specified data offset and the second media offset.

11. The method of claim 8 further comprising:

updating the estimated data segment size in accordance with header information from a data segment associated with the second media offset to provided an updated estimated data segment size; and estimating a third media offset based on the specified data offset, the second media offset, and the updated data segment size.

12. A computer-executable program product having program instructions stored on a computer-readable medium for executing the operations of claim 6.

13. A system for storing session data to a sequential access storage medium, the system comprising:

a buffer that receives the session data;

an allocation module allocating the session data in the buffer to a plurality of variable-length data segments, each variable-length data segment including a header having a predetermined signature field;

an alignment module aligning each header with a predetermined alignment interval on the sequential access storage medium; and a recording module recording each variable-length data segment to the sequential access storage medium such that no session data that matches the predetermined signature field is aligned with the predetermined alignment interval.

14. The system of claim 13 wherein the recording module is configured to divide a variable length data segment into a first data segment and a second data segment if the data segment includes session data that matches the predetermined signature field is aligned with the predetermined alignment interval.

15. A system for retrieving recorded data from a specified data offset on the sequential access storage medium including a plurality of variable-length data segments, the system comprising:

an estimation module iteratively estimating one or more estimated media offsets associated with data segments;

a reader configured to read data from the sequential access storage medium in accordance with a provided media offset;

an evaluation module evaluating each estimated media offset on the sequential access storage medium to determine whether the data segment located at each estimated media offset includes the specified data offset;

a positioning module positioning the reader on the sequential access storage medium to the data segment that includes the specified data offset; and an input module receiving from the reader the recorded data located in the data segment at the specified data offset.

16. The system of claim 15 further comprising:

on-line information recorded on the sequential access storage medium including an average data segment length, wherein the estimation module uses the average data segment length to estimate.

17. The system of claim 16 wherein the on-line information is updated with each estimate iteration based on header information of each data segment evaluated by the evaluation module.

18. A computer data signal embodied in a carrier wave by a computing system and encoding a computer program for executing a computer process for storing session data to a sequential access storage medium, the computer program comprising instructions for:

allocating the session data to a plurality of variable-length data segments, each variable-length data segment including a header having a predetermined signature field; and recording each variable-length data segment in alignment with a predetermined alignment interval on the sequential access storage medium such that no session data that matches the predetermined signature field is aligned with the predetermined alignment interval.

19. A computer data signal embodied in a carrier wave by a computing system and encoding a computer program for executing a computer process for retrieving recorded data from a specified data offset on the sequential access storage medium including a plurality of variable-length data segments, the computer program comprising instructions for:

iteratively estimating one or more estimated media offsets associated with data segments;

evaluating each estimated media offset on the sequential access storage medium to determine whether the data segment located at each estimated media offset includes the specified data offset; and retrieving the recorded data located in the data segment at the specified data offset.

* * * * *